United States Patent [19]

Geibel et al.

[11] Patent Number: 4,892,929

[45] Date of Patent: Jan. 9, 1990

[54] MELT STABILIZATION OF POLY ARYLENE SULFIDE KETONE

[75] Inventors: Jon F. Geibel, Bartlesville, Okla.; Roger G. Gaughan, Piscataway, N.J.; Michael D. Cliffton, Kingsport, Tenn.

[73] Assignee: Phillips Petroleum Company, Bartlesville, Okla.

[21] Appl. No.: 272,620

[22] Filed: Nov. 16, 1988

[51] Int. Cl.$^4$ .................. C08G 6/00; C08G 75/16
[52] U.S. Cl. .................. 528/480; 528/226; 528/388; 528/481; 528/488; 528/503
[58] Field of Search ............ 528/480, 481, 488, 503, 528/226, 388

[56] References Cited

U.S. PATENT DOCUMENTS

| | | | |
|---|---|---|---|
| 3,317,487 | 5/1967 | Smith | 260/79 |
| 3,354,129 | 11/1967 | Edmonds et al. | 260/79 |
| 3,524,835 | 8/1970 | Edmounds et al. | 260/79.1 |
| 3,717,620 | 2/1973 | Rohlfing | 260/79 |
| 3,793,256 | 2/1974 | Scoggin et al. | 260/79 |
| 4,274,993 | 6/1981 | Narisawa et al. | 2160/37 R |
| 4,590,104 | 5/1986 | Zeiner et al. | 427/389.9 |

*Primary Examiner*—Harold D. Anderson
*Attorney, Agent, or Firm*—Richmond, Phillips, Hitchcock & Umphlett

[57] ABSTRACT

Melt stable polymeric resins are provided by process which comprises heating a first particulate resin selected from the group consisting of poly(arylene sulfide ketone) and poly(arylene sulfide diketone), while in the presence of a gaseous oxidizing atmosphere, to a temperature at least about 150° C. (302° F.) but below the melting point of the first particulate resins, for time sufficient to produce a second particulate resin. The thermal stability of the second particulate resin is superior to that of its respective first particulate resin is superior to that of its respective first particulate resin. Moreover, the molecular weight of the second particulate resin is greater than that of its respective first particulate resin.

35 Claims, No Drawings

MELT STABILIZATION OF POLY ARYLENE SULFIDE KETONE

FIELD OF THE INVENTION

The invention relates to a method for preparing and treating poly(arylene sulfide ketone)s and/or poly(arylene sulfide diketone)s. In another aspect, the invention also relates to films, fibers, and other articles of manufacture prepared from the aforementioned treated poly(arylene sulfide ketone)s and/or poly(arylene sulfide diketone)s.

BACKGROUND OF THE INVENTION

Poly(arylene sulfide ketone)s, henceforth PASK, and poly(arylene sulfide diketone)s, henceforth PASDK, are engineering thermoplastics of potential commercial interest for film, fiber, molding, and composite applications because of their high melting points and high heat resistance. General processes for the production of PASK and PASDK are known in the art.

One disadvantage often associated with the preparation of PASK and PASDK resins pertains to the resins' thermal stability. Specifically, PASK and PASDK resins are generally plagued by having associated therewith relatively low thermal stabilities. When either PASK or PASDK resins are prepared and recovered by conventional methods, the resins contain volatile by-product materials. These volatiles often show their presence when the resins are heated to a temperature of at least about 315° C. (600° F.). Since many subsequent polymer processing procedures (e.g., melt-forming, extrusion and blow-molding) often require that the resin be heated to a temperature above its melting point, and since both PASK and PASDK resins have melting points above about 315.6° C. (600.1° F.), the subsequent melt-processing of PASK and PASDK resins results in these volatiles vaporizing and/or boiling through the polymeric resin, thus, leaving voids therethrough. This vaporization of volatile materials is commonly known in the polymer industry as "degassing" and/or "outgassing". One detrimental effect of this degassing phenomena is that of decreasing the melt stability of the PASK and PASDK resins. Since high melt stability is a necessary characteristic of resins which are to be melt processed, a low melt stability makes melt-processing procedures very difficult, if not impossible.

Melt-processing PASK or PASDK resins in a manner which results in a substantially void-free product has many inherent commercial applications. Therefore, it would be most desirable to produce melt stable PASK or PASDK resins of good polymer quality. Moreover, melt stable PASK and PASDK resins would also have associated therewith improved processability, color, texture, flexibility, and/or toughness. Accordingly, an object of this invention is to provide a method for preparing and recovering melt stable PASK or PASDK resins.

Another object of this invention is to provide a method for melt-processing PASK and/or PASDK resins to form final products having improved color, texture, flexibility and/or toughness.

Other objects concepts and aspects of this invention will be apparent to those skilled in the art upon reading the following Detailed Description and appended claims.

SUMMARY OF THE INVENTION

In accordance with this invention, melt stable polymeric resins are provided by process which comprises heating a first particulate resin selected from the group consisting of PASK and PASDK, while in the presence of a gaseous oxidizing atmosphere, to a temperature at least about 150° C. (302° F.) but below the melting point of the first particulate resins, for time sufficient to produce a second particulate resin. The thermal stability of the second particulate resin is superior to that of its respective first particulate resin. Moreover, the molecular weight of the second particulate resin is greater than that of its respective first particulate resin.

DETAILED DESCRIPTION OF THE INVENTION

The "melt stability" and/or "thermal stability" of the resins treated in accordance with the inventive process disclosed herein is determined by visually observing the amount of "voids" in a final product prepared by melt processing the polymer. The term "voids" as used herein refer to bubble-like gas-filled spaces in the solid, melt processed product prepared from untreated PASK and PASDK resins.

According to the present invention, the molecular weight of the PASK or PASDK polymers is determined by measuring the polymers' inherent viscosity. A high inherent viscosity indicates that the polymer has a high molecular weight and vice versa. For the purposes of this invention inherent viscosity of the PASK and/or PASDK resins is determined according to ASTM D2857 at 30° C. in concentrated sulfuric acid.

Since this invention can be practiced any time after a first particulate PASK or PASDK resin has been recovered from a polymerization reaction mixture, it can be viewed as either (1) an effective means for providing a polymeric resin having associated therewith improved thermal stability and increased molecular weight, or (2) a means for improving the thermal stability and simultaneously increasing the molecular weight of a particulate resin which has previously been prepared, recovered and, optionally, dried.

The polymers which are most apt to be prepared and/or treated by the process of this invention, because of the availability of materials from which they are prepared, are those having the repeating unit:

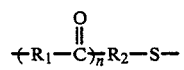

where, n is 1 or 2; and, $R_1$ and $R_2$ can be the same or different and are selected from the group consisting of phenylene, biphenylene, naphthylene, biphenylene ether, and lower alkyl-substituted derivatives thereof. The term "lower alkyl", as used herein, refers to alkyl groups having 1 to 6 carbon atoms. Examples of such lower alkyl groups include, but are not limited to, methyl, propyl, isobutyl, n-hexyl, and the like.

Although other polymeric resins are not excluded, in general, the presently preferred PASK resins prepared and/or treated by the inventive process disclosed herein are poly(phenylene sulfide ketone) resins having as the repeating unit:

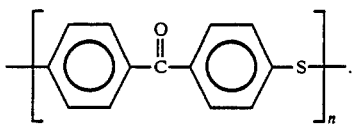

In general, the presently preferred PASDK resins prepared and/or treated by the inventive process herein are poly(phenylene sulfide diketone) resins having as the repeating unit:

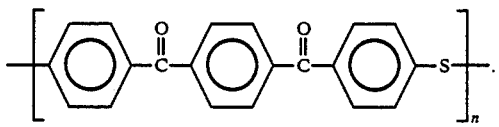

In accordance with this invention, melt stable polymeric resins are provided by process which comprises heating a first particulate resin selected from the group consisting of PASK and PASDK, while in the presence of a gaseous oxidizing atmosphere, to a temperature at least about 150° C. (302° F.) but below the melting point of the first particulate resins, for time sufficient to produce a second particulate resin. The thermal stability of the second particulate resin is superior to that of its respective first particulate resin. Moreover, the molecular weight of the second particulate resin is greater than that of its respective first particulate resin.

As opposed to its respective first particulate resin, the second particulate resin produced in accordance with this invention is commercially processable at temperatures above the melting point of the second particulate resin. It should be noted, that prior to employing this inventive process it was very difficult to process a first particulate PASK or PASDK resin at temperatures above its melting point due to the low thermal stability of the melted first particulate resin.

When practicing this invention, the first particulate resin is heated to a temperature which is below its melting point but at least about 150° C. (302° F.). Generally, the first particulate resin is heated to a temperature which is at least about 175° C. (347° F.) but does not exceed 10° C. (18° F.) below its melting point. Preferably, the first particulate resin is heated to a temperature which is at least about 200° C. (392° F.) but does not exceed 25° C. (45° F.) below its melting point.

In order to practice the embodiments of this invention, it is necessary to known the melting point of the PASK or PASDK resin. These melting points can be readily determined by many different methods known to those skilled in the art. One such process is referred to as Differential Thermal Analysis. Differential Thermal Analysis, often referred to as DTA, generally consists of inserting a thermocouple into a sample tube containing from about 0.1 to about 20 mg of the sample. A duplicate tube, containing a reference material, is also prepared. The two tubes are inserted into a heating block, side-by-side, and heated at a uniform programmed rate. For PASK and PASDK resin samples, the atmosphere must be controlled to suppress any undesirable reaction such as oxidative curing.

The plot of the difference in temperature between the sample and the reference ($\Delta T$) is an indication of the energy gains or losses in the specimen under investigation. When an endothermic change occurs, the specimen temperature lags behind the reference temperature because of the heat required to carry out the transition. When the transition is complete, thermal diffusion brings the sample back to equilibrium quickly. The thermal trace would show a sharp depression followed by a return to nearly a zero value for $\Delta T$. The melting point is taken from the DTA thermogram in a conventional manner known to those skilled in the art.

PASK resins generally have melting points ranging from about 250° C. (482° F.) to about 500° C. (932° F.). If the PASK resin is poly(phenylene sulfide ketone) the melting point is approximately 345° C. (653° F.).

PASDK resins generally have melting points ranging from about 275° C. (527° F.) to about 500° C. (932° F.). If the PASDK resin is poly(phenylene sulfide diketone) the melting point is approximately 400° C. (752° F.).

The time during which the first particulate PASK or PASDK resin is held at the elevated curing temperature, in accordance with this invention, depends, in part, upon the nature of the first particulate resin and the curing temperature. As the curing temperature nears the melting point of the first particulate resin, the time needed to achieve a desired level of thermal stability and/or a desired increased molecular weight decreases. Generally, treating times will range from about 10 minutes to about 72 hours, preferably from about 30 minutes to about 8 hours, with longer times being associated with the lower curing temperatures and vice versa.

In accordance with this invention, the first particulate PASK or PASDK resin is heated to the desired curing temperature and maintained at that temperature while in the presence of a gaseous oxidizing atmosphere. Examples of such an oxidizing atmosphere include, but are not limited to, oxygen, any mixture of oxygen and an inert gas (e.g., nitrogen, carbon dioxide and/or argon) or air. Due to economic feasibility, air is the presently preferred gaseous oxidizing atmosphere.

When the desired level of thermal stability and/or the desired increased molecular weight is reached, the gaseous oxidizing atmosphere can be replaced with an inert medium.

The phrase "inert medium" as used herein refers to a liquid medium, a gaseous medium, or a mixture of both which is substantially free of an oxidizing component. It is presently preferred that the inert medium be in a gaseous phase. Examples of gaseous inert mediums include, but are not limited to, nitrogen, carbon dioxide, argon or mixtures thereof.

After a first particulate PASK or PASDK resin is subjected to the heat treating process of this invention, a body of heated second particulate resin is produced. This body of heat treated second particulate PASK or PASDK resin can then be cooled by any suitable means known by those skilled in the art. In a presently preferred embodiment, the cooling is accomplished by passing a cooled gaseous inert medium over the heated second particulate resin.

After the temperature of the heat treated second particulate PASK or PASDK resin has been lowered to below that which the polymer can no longer be oxidized, the heat treated second particulate PASK or PASDK particles can be permitted to come into contact with an oxidizing atmosphere (e.g., air) without further affecting the thermal stability and/or molecular weight of the resin. The temperature below the second particulate PASK or PASDK resin should be lowered such that no further oxidative curing results is, generally, below about 150° C. (302° F.); preferably, below about 125° C. (257° F.).

The resulting second particulate PASK or PASDK resin has a thermal stability which is superior to its respective first particulate resin. Moreover, the resulting second particulate resin has a molecular weight which is greater than its respective first particulate resin.

The heat treated second particulate PASK or PASDK resin produced in accordance with this invention is particulate form. This resin is highly desirable for handling purposes and subsequent processing. The treated PASK and/or PASDK resins can be used to make final products such as films, fibers and/or molded articles. These products have fewer voids and have improved color, texture, flexibility and toughness when compared to products made from its respective first particulate resin.

The thermal stability of the resulting novel particulate PASK or PASDK resin can be even further improved by subjecting the novel resin to a caustic treating process. This subequent washing process is conducted at an elevated temperature with a suitable base such as an alkali metal carbonate or an alkali metal hydroxide. Alkali metal hydroxides are the presently preferred bases and include, but are not limited to, sodium hydroxide, lithium hydroxide, potassium hydroxide, rubidium hydroxide and cesium hydroxide. The most preferred alkali metal hydroxide, due to its effectiveness and commercial availability, is sodium hydroxide. Generally, the temperature at which the resulting novel particulate resin can be treated with the suitable base ranges from about 50° C. (122° F.) to about 250° C. (482° F.), preferably, from about 100° C. (212° F.) to about 225° C. (437° F.).

Another means of further improving the thermal stability of the resulting third particulate resin of the first embodiment or the second particulate resin of the second embodiment is by washing the respective particulate resin, at an elevated temperature, with water-soluble calcium cations. It is preferred that the calcium cations be employed as a salt such as a calcium halide or a calcium carboxylate. Preferably suitable calcium salts include, but are not limited to, calcium chloride, calcium fluoride, calcium bromide, calcium iodide, calcium acetate, and the like, and mixtures of any two or more thereof. The most preferred calcium salts, due to their effectiveness and commercial availability, are calcium chloride and calcium acetate.

Generally, the temperature at which the resulting novel particulate resin can be treated with the suitable calcium cation ranges from about 50° C. (122° F.) to about 250° C. (482° F.), preferably from about 100° C. (212° F.) to about 225° C. (437° F.).

The process of subsequently washing the particulate PASK and/or PASDK resin resulting from either embodiment of this invention, with either a base or the calcium cations or both, can be carried out with conventional equipment. A convenient method for carrying out a subsequent treating procedure is to first recover the second particulate PASK or PASDK resin. The recovered particulate resin is then contacted with the base and or the calcium cations in an enclosed vessel having provided therein a means of agitation. The contacting can be carried out in a single vessel or in a plurality of vessels.

EXAMPLE

The following Example is provided to assist in a further understanding of the invention. Particular materials employed, species and conditions are intended to be further illustrative of our invention and not limitative of the reasonable scope thereof.

EXAMPLE

This example demonstrates how solid state curing a poly(arylene sulfide ketone) resin affects the molecular weight of the treated resin and the void content of compression molded film produced from the treated resin.

The specific poly(arylene sulfide ketone) resin used to demonstrate the effectiveness of this invention is poly(phenylene sulfide ketone) (PPSK). The PPSK resin used in this example, and henceforth referred to as Resin 1, was prepared in a stirred 1 liter stainless steel autoclave by charging 0.432 mole of sodium sulfide flake (charged as a 56.8 wt. % $Na_2S$ assay), 0.445 mole 4,4'-dichlorobenzophenone (DCBP) and 3.46 moles N-methyl-2-pyrrolidone (NMP) into the reactor. The polymerization mixture was then heated to 250° C. and held for 3 hours. After polymerizing at 250° C. for three hours, the reaction mixture was cooled to 200° C. and 0.18 mole methyl chloride in 1 mole NMP was pressured into the reactor. The reactor temperature was held at 200° C. for an additional hour to endcap the PPSK resin. The polymerization mixture was then allowed to cool to room temperature.

The cooled reactor effluent was added to ambient deionized water and filtered to recover the PPSK polymer. The PPSK was then washed 4 times with 95° C.-100° C. deionized water. After washing, the PPSK was dried in a vacuum oven at 110° C. under a nitrogen atmosphere.

A second resin sample (i.e., Resin 2) was prepared in accordance with the process set out for the preparation of Resin 1 with the following exceptions. First, the sulfur source used in the preparation of Resin 2 was provided by charging 0.432 mole sodium bisulfide (NaSH) as a 58.2 wt. % solid solution in water and 0.426 mole sodium hydroxide (NaOH) into the autoclave reactor. Second, 0.426 mole of DCBP was charged into the reactor. Next, after polymerization, the PPSK was endcapped by charging into the reactor 0.012 mole DCBP in 1 mole NMP at 200° C. followed by heating the reactor's contents to 250° C. and maintaining that temperature for 1.5 hours. Finally, the recovered PPSK was washed 7 times in 80° C. deionized water and subsequently dried in a vacuum oven at 100° C. under a nitrogen atmosphere.

Two other PPSK resins (i.e., Resins 3 and 4, inclusive) were prepared in a stirred 2 gallon stainless steel autoclave reactor.

Resin 3 was prepared by charging 3 moles sodium bisulfide (charged as a 58.7 wt. % solid NaSH in water), 3 moles sodium carbonate (NaOH), and 30 moles NMP into the autoclave reactor. The reactor was purged with nitrogen and heated to 160° C. to dehydrate the reactor's contents. The internal temperature of the reactor was then increased to about 200° C. During the process, approximately 220 mL of water and NMP were removed. The reactor's contents were then cooled to 100° C., after which 3 moles DCBP charged therein. The reactor was again purged with nitrogen, heated to 160° C. and held for 30 minutes. After the 30 minute dehydration period the internal temperature of the reactor was raised to 250° C. and maintained at that temperature for approximately 5 hours. After the 5 hour reaction period, the polymerization reaction mixture was then allowed to cool to room temperature.

The reactor effluent containing Resin 3 was water washed with city water and suction filtered. The PPSK polymer was then given two 30 minute 185° C. deionized water washes. After the second 30 minute water wash, the polymeric filter cake was rinsed with deionized water and acetone. The PPSK was then dried in a forced air oven at 110° C.

Resin 4, on the other hand, was prepared by charging 2.01 moles sodium bisulfide (charged as a 58.7 wt. % solid NaSH in water), 2.0 moles NaOH, 2.0 moles DCBP, 6 moles water and 24 moles NMP into the reactor. The internal temperature of the reactor was then increased to 250° C. and maintained at that temperature for approximately 4 hours. After the 4 hour reaction period and while the internal temperature of the reactor was still 250° C., 0.027 mole 4-chlorobenzophenone in 7 moles NMP was pressurized into the reactor. The temperature of the reactor's contents were held at 250° C. for an additional hour to endcap the PPSK resin. The polymerization mixture was then allowed to cool to room temperature.

The reactor effluent containing Resin 4 was filtered to recover the PPSK polymer. The PPSK was then slurried with a 1% NaOH solution (30 grams (0.75 mole) NaOH and 3000 ml water). The polymeric slurry was then heated to 120° C. and maintained at that temperature for 30 minutes. The slurry was cooled to about 100° C. and subsequently filtered. The PPSK was then slurried with a 5% $CaCl_2$ solution (150 grams (1.35 moles) $CaCl_2$ and 3000 ml water). This second polymeric slurry was heated to 185° C. and maintained at that temperature for 30 minutes. The slurry was again permitted to cool to room temperature and then filtered. The PPSK was then washed twice with ambient city water and dried in a forced air oven at 110° C.

A series of 1.5 g samples of each of Resins 1, 2 and 4 were placed in aluminum weighing pans and treated by placing each in a forced air oven at 316° C. for varying periods of time not exceeding 6 hours. Individual samples were periodically removed. Upon removal, the inherent viscosity of the respective resins was determined according to ASTM D2857 at 30° C. in concentrated sulfuric acid. Resin 3 was treated in a similar manner except that 6 g samples (as opposed to 1.5 g samples) were used.

Films were compression molded for the treated samples of Resins 1 and 2. All the treated samples yielded tough, contiguous and creasable films.

The results of the treatment of Resins 1 and 2, and subsequent film evaluation are presented in Table I.

TABLE I

| | Effects of Solid State Curing Poly(Arylene Sulfide Ketone) Resins | | | |
|---|---|---|---|---|
| Resin No. | Sample | Treatment time (min) | Inherent viscosity, (dL/g)[a] | Film Rating[b] |
| 1 | a[c] | 0 | 0.67 | — |
| | b | 10 | 0.76 | 5 |
| | c | 20 | 0.86 | 4 |
| | d | 30 | 0.75 | 3 |
| | e | 40 | 0.85 | 2 |
| | f | 50 | — | 2 |
| | g | 120 | — | 1 |
| 2 | h[c] | 0 | 0.64 | — |
| | i | 60 | 0.75 | 5 |
| | j | 120 | 0.83 | 4 |

TABLE I-continued

| | Effects of Solid State Curing Poly(Arylene Sulfide Ketone) Resins | | | |
|---|---|---|---|---|
| Resin No. | Sample | Treatment time (min) | Inherent viscosity, (dL/g)[a] | Film Rating[b] |
| | k | 240 | — | 3 |
| | l | 360 | — | 2 |

[a]Inherent viscosities of samples indicated with a "—" were not measured because the samples were insoluble in concentrated $H_2SO_4$.
[b]The films were qualitatively rated on a scale of 1 to 5 with 1 being indicative of no voids and 5 being indicative of many voids. Samples indicated with a "—" were not processed into films.
[c]Control runs.

The results of Table I demonstrate that void content in compression molded films decreases significantly and consistently with increasing treatment time, (see Samples e, f, and g of Resin 1 and Sample 1 of Resin 2). Therefore, the data in Example 1 demonstrates that solid state curing can be used to produce PPSK resins that are melt processable into articles that are essentially void free. In addition, Samples a, b and c of Resin 1 and Samples h, i and j of Resin 2 demonstrate that solid state curing PPSK resins increases the resin's inherent viscosity, and therefore the resin's molecular weight. This is further supported by considering the effect of solid state curing Resins 3 and 4. The results of solid state curing of Resins 3 and 4 are presented in Table II.

TABLE II

| | Effects of Solid State Curing Poly(Arylene Sulfide Ketone) Resins | | |
|---|---|---|---|
| Resin No. | Sample | Treatment time (hrs) | Inherent viscosity (dL/g) |
| 3 | m[a] | 0 | 0.23 |
| | n | 1 | 0.35 |
| | o | 2 | 0.38 |
| | p | 3 | 0.45 |
| | q | 4 | 0.52 |
| | r | 5 | 0.55 |
| | s | 6 | 0.63 |
| 4 | t[a] | 0 | 0.55 |
| | u | 0.5 | 0.53 |
| | v | 1.0 | 0.56 |
| | w | 2.0 | 0.59 |
| | x | 4.0 | 0.64 |
| | y | 6.0 | 0.67 |

[a]Control runs.

The results of Table II demonstrate that solid state curing significantly increases the inherent viscosity, and therefore the molecular weight, of the PPSK resin. It is not known why the inherent viscosity of sample u of Resin 4 was lower than that of sample t of the same Resin.

It is evident from the foregoing that various modifications can be made to the embodiments of this invention without departing from the spirit and scope thereof which will be apparent to those skilled in the art. Having thus described the invention, it is claimed as follows.

That which is claimed is:

1. A method to provide a melt stable polymeric resin while simultaneously increasing its molecular weight comprising:

heating a first particulate resin selected from the group consisting of poly(arylene sulfide ketone) and poly(arylene sulfide diketone), while in the presence of a gaseous oxidizing atmosphere, to a temperature at least about 150° C. (302° F.) but below the melting point of said first particulate resin, for time sufficient to produce a second particulate resin, wherein the melt stability of said second particulate resin is superior to that of said first particulate resin, and wherein the molecular weight of said second particulate resin is greater than that of said first particulate resin.

2. A method in accordance with claim 1 wherein said first particulate resin is poly(arylene sulfide ketone).

3. A method in accordance with claim 2 wherein said poly(arylene sulfide ketone) is heated to a temperature ranging from about 175° C. (347° F.) to a temperature not exceeding about 10° C. (18° F.) below the melting point of said poly(arylene sulfide ketone).

4. A method in accordance with claim 3 wherein said poly(arylene sulfide ketone) is heated to a temperature ranging from about 200° C. (392° F.) to a temperature not exceeding about 25° C. (45° F.) below the melting point of said poly(arylene sulfide ketone).

5. A method in accordance with claim 2 wherein said gaseous oxidizing atmosphere is a gaseous mixture comprising oxygen and nitrogen.

6. A method in accordance with claim 5 wherein said gaseous oxidizing atmosphere is air.

7. A method in accordance with claim 2 further comprising the step of purging said second particulate resin with an inert gaseous medium after the desired level of melt stability has been reached to remove the presence of substantially all of said gaseous oxidizing atmosphere.

8. A method in accordance with claim 7 further comprising cooling said second particulate resin to a temperature below about 150° C. (302° F.).

9. A method in accordance with claim 8 wherein said inert medium is selected from the group consisting of nitrogen, carbon dioxide and argon.

10. A method in accordance with claim 2 wherein said poly(arylene sulfide ketone) is poly(phenylene sulfide ketone).

11. A method in accordance with claim 10 wherein said temperature to which said poly(phenylene sulfide ketone) is heated is in the range from about 300° C. (572° F.) to about 335° C. (635° F.).

12. A method in accordance with claim 11 wherein said temperature to which said poly(phenylene sulfide ketone) is heated is in the range from about 315° C. (600° F.) to about 320° C. (608° F.).

13. A method in accordance with claim 2 even further comprising melt processing said second particulate resin at a temperature above the melting point of said second particulate resin.

14. A method in accordance with claim 1 wherein said first particulate resin is poly(arylene sulfide diketone).

15. A method in accordance with claim 14 wherein said poly(arylene sulfide diketone) is heated to a temperature ranging from about 175° C. (347° F.) to a temperature not exceeding about about 10° C. (18° F.) below the melting point of said poly(arylene sulfide diketone).

16. A method in accordance with claim 15 wherein said poly(arylene sulfide diketone) is heated to a temperature ranging from about 200° C. (392° F.) to a temperature not exceeding about 25° C. (45° F.) below the melting point of said poly(arylene sulfide diketone).

17. A method in accordance with claim 14 wherein said gaseous oxidizing atmosphere is a gaseous mixture comprising oxygen and nitrogen.

18. A method in accordance with claim 17 wherein said gaseous oxidizing atmosphere is air.

19. A method in accordance with claim 18 further comprising the step of purging said second particulate resin with an inert gaseous medium after the desired level of melt stability has been reached to remove the presence of substantially all of said gaseous oxidizing atmosphere.

20. A method in accordance with claim 14 further comprising cooling said second particulate resin to a temperature below about 150° C. (302° F.).

21. A method in accordance with claim 14 wherein said inert medium is selected from the group consisting of nitrogen, carbon dioxide and argon.

22. A method in accordance with claim 14 wherein said poly(arylene sulfide diketone) is poly(phenylene sulfide diketone).

23. A method in accordance with claim 22 wherein said temperature to which said poly(phenylene sulfide diketone) is heated is in the range from about 300° C. (572° F.) to about 392° C. (738° F.).

24. A method in accordance with claim 23 wherein said temperature to which said poly(phenylene sulfide diketone) is heated is in the range from about 315° C. (600° F.) to about 377° C. (711° F.).

25. A method in accordance with claim 14 even further comprising melt processing said second particulate resin at a temperature above the melting point of said second particulate resin.

26. A method in accordance with claim 1 wherein said second particulate resin is subsequently washed at an elevated temperature with a caustic treating solution.

27. A method in accordance with claim 26 wherein said elevated temperature ranges from about 50° C. to about 250° C.

28. A method in accordance with claim 27 wherein said caustic treating solution comprises an alkali metal carbonate or an alkali metal hydroxide or both.

29. A method in accordance with claim 28 wherein said caustic treating solution comprises sodium hydroxide.

30. A method in accordance with claim 1 wherein said second particulate resin is subsequently washed at an elevated temperature with a solution comprising water and water soluble calcium cations.

31. A method in accordance with claim 30 wherein said elevated temperature ranges from about 50° C. to about 250° C.

32. A method in accordance with claim 31 wherein said water-soluble calcium cations are employed as a calcium salt.

33. A method in accordance with claim 32 wherein said calcium salt comprises calcium compounds selected from the group consisting of calcium halides, calcium carboxylates and mixtures thereof.

34. A method in accordance with claim 33 wherein said calcium salt comprises calcium chloride.

35. A method in accordance with claim 33 wherein said calcium salt comprises calcium acetate.

* * * * *